US012365072B2

(12) United States Patent
Nettleton et al.

(10) Patent No.: US 12,365,072 B2
(45) Date of Patent: Jul. 22, 2025

(54) POWERED FASTENER DRIVER

(71) Applicant: MILWAUKEE ELECTRIC TOOL CORPORATION, Brookfield, WI (US)

(72) Inventors: Coby A. Nettleton, Milwaukee, WI (US); Alex D. Servais, Slinger, WI (US); Connor D. Sreenan, Wauwatosa, WI (US); Jason M. Julius, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 16 days.

(21) Appl. No.: 18/127,085

(22) Filed: Mar. 28, 2023

(65) Prior Publication Data

US 2023/0302618 A1 Sep. 28, 2023

Related U.S. Application Data

(60) Provisional application No. 63/354,395, filed on Jun. 22, 2022, provisional application No. 63/324,308, filed on Mar. 28, 2022.

(51) Int. Cl.
*B25C 1/06* (2006.01)
*B25C 1/00* (2006.01)
*B25C 1/04* (2006.01)

(52) U.S. Cl.
CPC ................ *B25C 1/06* (2013.01); *B25C 1/001* (2013.01); *B25C 1/041* (2013.01); *B25C 1/047* (2013.01)

(58) Field of Classification Search
CPC ........... B25C 1/06; B25C 1/001; B25C 1/041; B25C 1/047
See application file for complete search history.

(56) References Cited

U.S. PATENT DOCUMENTS 3,464,614 A 9/1969 Volkmann
4,630,766 A 12/1986 Steeves et al.
(Continued)

FOREIGN PATENT DOCUMENTS

CN 104209926 B 5/2016
DE 2437063 A1 2/1976
(Continued)

OTHER PUBLICATIONS

Milwaukee Electric Tool, "Milwaukee Electric Tool: M18™ Fuel™ Finishing Nailers and Applicable Magazine Assemblies," Service Parts List, Bulletin No. 54-00-FNLR, Oct. 2019 (5 pages).
(Continued)

*Primary Examiner* — Andrew M Tecco
*Assistant Examiner* — Nicholas E Igbokwe
(74) *Attorney, Agent, or Firm* — Michael Best & Friedrich LLP

(57) ABSTRACT

A powered fastener driver including a housing, an inner frame positioned within the housing, and a workpiece contact assembly coupled to the housing and movable from an extended position to a retracted position in response to contact with a workpiece. The workpiece contact assembly includes a biasing element that biases the workpiece contact assembly into the extended position. The workpiece contact assembly is engageable with the inner frame in response to an applied force that moves the workpiece contact assembly beyond the retracted position.

20 Claims, 16 Drawing Sheets

(56) References Cited

U.S. PATENT DOCUMENTS

| | | | |
|---|---|---|---|
| 5,579,975 | A | 12/1996 | Moorman |
| 5,664,468 | A | 9/1997 | Murayama et al. |
| 5,803,338 | A | 9/1998 | Singer et al. |
| 6,053,389 | A | 4/2000 | Chu et al. |
| 6,186,386 | B1 | 2/2001 | Canlas et al. |
| 6,189,759 | B1 | 2/2001 | Canlas et al. |
| 6,371,348 | B1 | 4/2002 | Canlas et al. |
| 6,431,428 | B1 | 8/2002 | Chen |
| 6,431,429 | B1 | 8/2002 | Canlas et al. |
| 6,454,152 | B1 | 9/2002 | Nayrac et al. |
| 6,679,414 | B2 | 1/2004 | Rotharmel |
| 6,695,196 | B2 | 2/2004 | Hamada et al. |
| 6,851,595 | B1 | 2/2005 | Lee |
| 6,880,739 | B1 | 4/2005 | Zhu |
| 6,978,920 | B2 | 12/2005 | Hamada et al. |
| 7,134,586 | B2 | 11/2006 | McGee et al. |
| 7,213,732 | B2 | 5/2007 | Schell et al. |
| 7,325,709 | B2 | 2/2008 | Ishizawa et al. |
| 7,431,103 | B2 | 10/2008 | Schell et al. |
| 7,461,089 | B2 | 12/2008 | Barsness et al. |
| 7,506,787 | B2 | 3/2009 | Wu et al. |
| 7,641,089 | B2 | 1/2010 | Schell et al. |
| 7,845,530 | B2 | 12/2010 | Schell et al. |
| 7,922,058 | B2 | 4/2011 | Jian |
| 7,980,439 | B2 | 7/2011 | Akiba et al. |
| 8,006,883 | B2 | 8/2011 | Schell et al. |
| 8,061,437 | B2 | 11/2011 | Liang |
| 8,292,143 | B2 | 10/2012 | Lee et al. |
| 8,690,036 | B2 | 4/2014 | Schell et al. |
| 8,899,460 | B2 | 12/2014 | Wojcicki |
| 8,931,676 | B2 | 1/2015 | Braddock |
| 9,469,021 | B2 | 10/2016 | Gregory et al. |
| 9,486,904 | B2 | 11/2016 | Gregory et al. |
| 9,498,871 | B2 | 11/2016 | Gregory et al. |
| 9,643,305 | B2 | 5/2017 | Gregory et al. |
| 9,649,755 | B2 | 5/2017 | Gregory et al. |
| 9,827,658 | B2 | 11/2017 | Gregory et al. |
| 10,022,848 | B2 | 7/2018 | Gross et al. |
| 10,434,634 | B2 | 10/2019 | Garber |
| 10,632,604 | B2 | 4/2020 | Perron et al. |
| 10,717,179 | B2 | 7/2020 | Koenig et al. |
| 10,766,128 | B2 | 9/2020 | Gross et al. |
| 10,888,981 | B2 | 1/2021 | Gregory et al. |
| 11,141,849 | B2 | 10/2021 | Ferris et al. |
| 11,179,836 | B2 | 11/2021 | Gregory et al. |
| 2005/0001007 | A1 | 1/2005 | Butzen et al. |
| 2006/0249554 | A1 | 11/2006 | Butzen et al. |
| 2010/0276467 | A1* | 11/2010 | Kramer .................. B25C 1/008 227/8 |
| 2011/0062208 | A1 | 3/2011 | Hlinka et al. |
| 2013/0320063 | A1 | 12/2013 | Gregory et al. |
| 2013/0320064 | A1 | 12/2013 | Gregory et al. |
| 2015/0136828 | A1 | 5/2015 | Li |
| 2016/0229043 | A1* | 8/2016 | Wyler ..................... B25C 1/047 |
| 2017/0066116 | A1 | 3/2017 | Garber et al. |
| 2018/0001453 | A1* | 1/2018 | Jaskot ...................... B25C 1/06 |
| 2018/0009097 | A1* | 1/2018 | Cheatham ............... B25C 1/008 |
| 2018/0126531 | A1* | 5/2018 | Pomeroy .................. B25C 1/06 |
| 2020/0039043 | A1 | 2/2020 | Garber |
| 2020/0114500 | A1* | 4/2020 | Bierdeman ............. B25C 1/047 |
| 2020/0276690 | A1 | 9/2020 | Hegarty et al. |
| 2020/0306942 | A1 | 10/2020 | Koenig et al. |
| 2021/0107125 | A1 | 4/2021 | Gregory et al. |
| 2021/0299837 | A1* | 9/2021 | Garces ..................... B25C 1/06 |
| 2022/0001521 | A1 | 1/2022 | Ferris et al. |

FOREIGN PATENT DOCUMENTS

| | | | |
|---|---|---|---|
| DE | 29603812 | U1 | 6/1996 |
| DE | 102014016688 | A1 | 5/2016 |
| EP | 1894679 | B1 | 3/2010 |

OTHER PUBLICATIONS

Extended European Search Report for Application No. 23164220.8 dated Dec. 22, 2023 (9 pages).

* cited by examiner

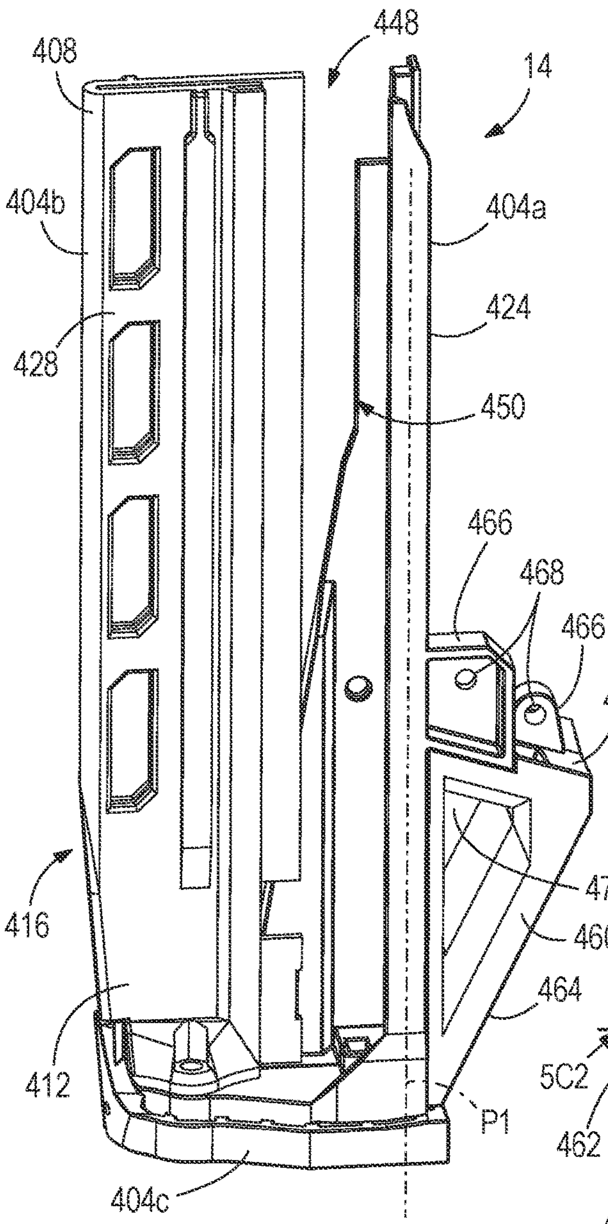
FIG. 5B
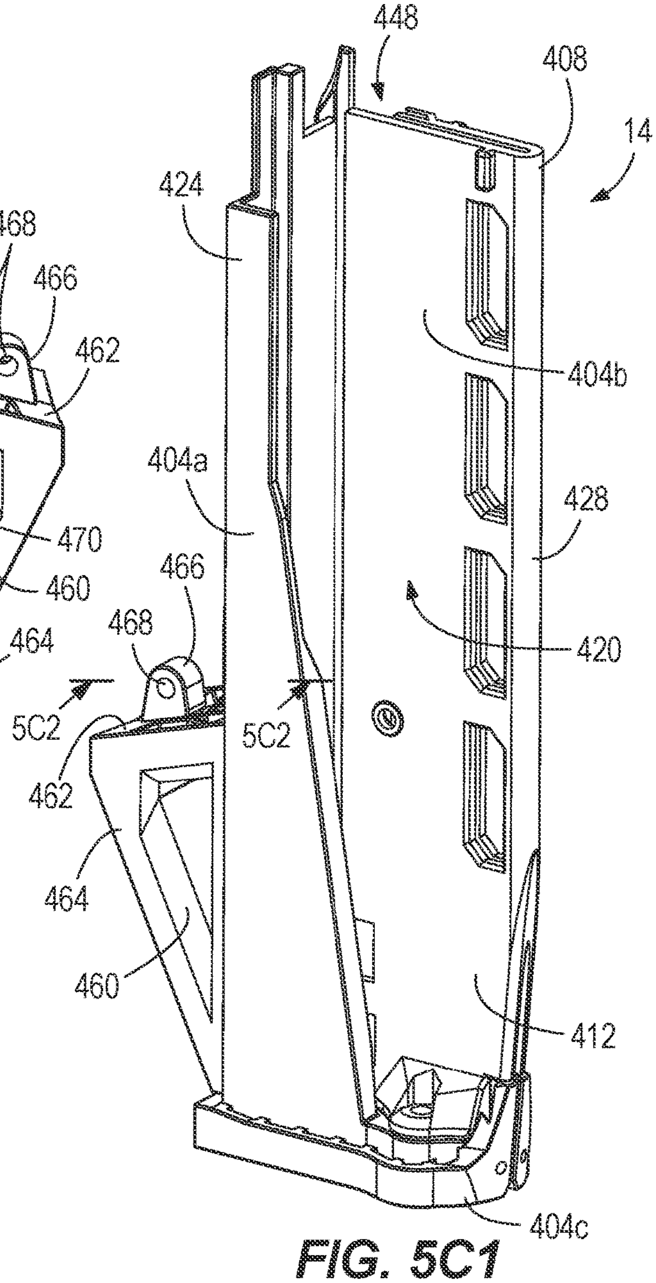
FIG. 5C1

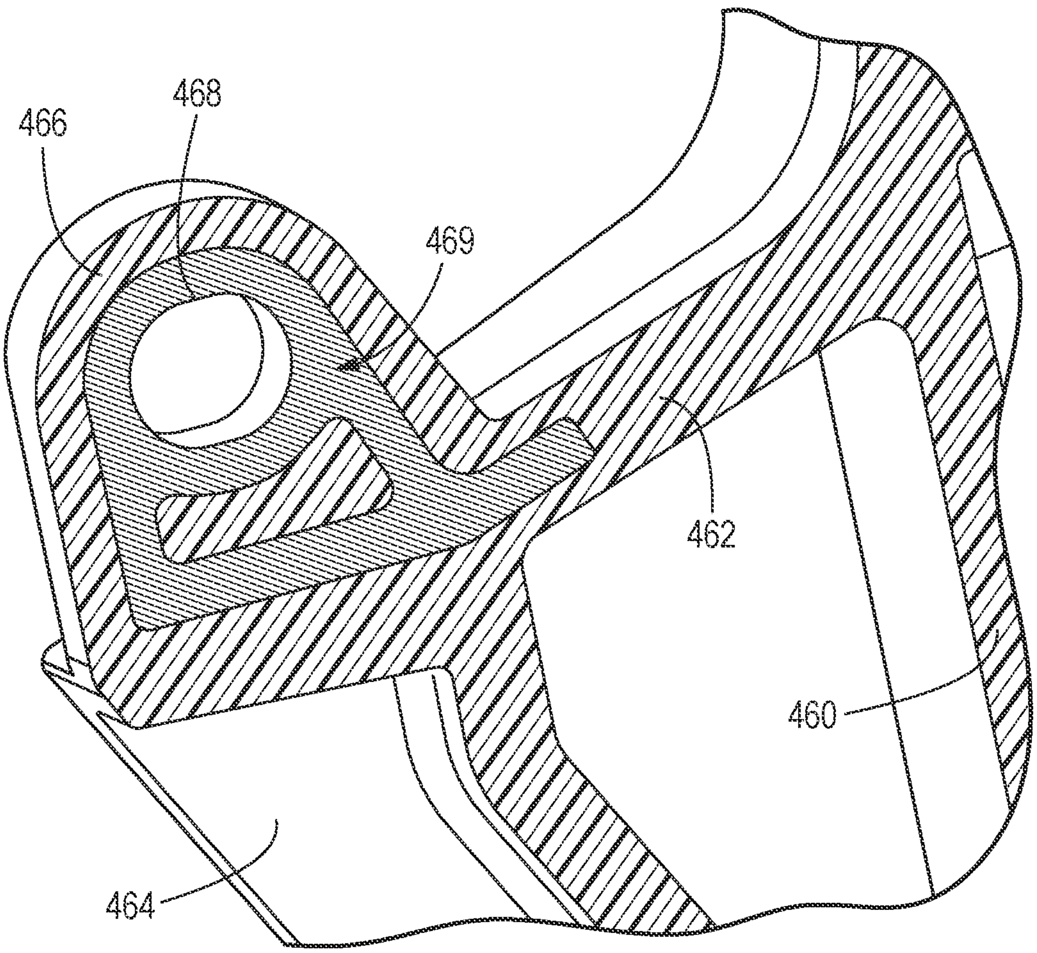
FIG. 5C2

POWERED FASTENER DRIVER

CROSS-REFERENCE TO RELATED APPLICATIONS

This application claims priority to U.S. Provisional Patent Application No. 63/354,395 filed on Jun. 22, 2022, and to U.S. Provisional Patent Application No. 63/324,308 filed on Mar. 28, 2022, the entire contents of both of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a powered fastener driver including a housing, a cylinder positioned within the housing, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade, in unison, from the BDC position toward the TDC position, and a drive unit positioned within the housing within the housing and operably coupled to the lifter. The drive unit including a motor having first output shaft that extends along a motor axis. An inner frame is positioned within the housing and includes a drive unit housing portion in which at least a portion of the drive unit is received. A workpiece contact assembly is coupled to the housing and movable from an extended position to a retracted position in response to contact with a workpiece. The workpiece contact assembly includes a biasing element that biases the workpiece contact assembly into the extended position. A magazine is configured to receive fasteners. The magazine includes a first end and a second end opposite the first end. A nosepiece assembly is coupled to the first end of the magazine and includes a channel from which consecutive fasteners from the magazine are driven. The workpiece contact assembly is engageable with the inner frame in response to an applied force that moves the workpiece contact assembly beyond the retracted position.

The present invention provides, in another aspect, a powered fastener driver including a housing, a cylinder positioned within the housing, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade, in unison, from the BDC position toward the TDC position, and a drive unit supported by the housing and operably coupled to the lifter. The drive unit includes a motor having first output shaft that extends along a motor axis. A magazine is configured to receive fasteners and includes a first end and a second end opposite the first end. A nosepiece assembly is coupled to the first end of the magazine and including a channel from which consecutive fasteners from the magazine are driven. The magazine is inclined relative to the channel with the second end being further from the housing than the first end in a direction parallel to the driving axis.

The present invention provides, in another aspect, a powered fastener driver including a housing defining cylinder support portion, a drive unit support portion, a handle portion that is spaced apart from the drive unit support portion, and a battery support portion spaced apart from the cylinder support portion. A cylinder is within the cylinder support portion, a piston is movable within the cylinder from a top-dead-center (TDC) position to a driven or bottom-dead-center (BDC) position, a driver blade is attached to the piston for movement therewith along a driving axis from the TDC position toward the BDC position for driving a fastener into a workpiece, a lifter is operable to move the piston and driver blade, in unison, from the BDC position toward the TDC position, and a drive unit is supported by the drive unit support portion and operably coupled to the lifter. The drive unit includes a motor having first output shaft that extends along a motor axis. A magazine is configured to receive fasteners and includes a first end, a second end opposite the first end, a top side, a bottom side opposite the top side. A support member extends from the top side and coupled to the housing. The support member includes a polygonal shape with a first side extending from the top side at a location between the first end and the second end, and a second side extending from the top side at a location at or adjacent the second end. A surface of the first side of the support member abuts a surface of the housing. A nosepiece assembly is coupled to the first end of the magazine and including a channel from which consecutive fasteners from the magazine are driven.

The present invention provides, in another aspect, a powered fastener driver including a housing, a cylinder positioned within the housing, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade, in unison, from the BDC position toward the TDC position, and a drive unit supported by the housing and operably coupled to the lifter. The drive unit includes a motor having first output shaft that extends along a motor axis. A magazine is configured to receive fasteners and includes a first end, a second end opposite the first end, a top side adjacent to the housing, and a bottom side opposite the top side. A guide positioned within the magazine and configured to receive a portion of each of the fasteners. The guide includes a first end and a second end opposite the first end. The guide is inclined relative to the first end of the magazine with the second end of the guide being further from the top side than the first end of the guide in a direction parallel to the driving axis. A nosepiece assembly is coupled to the first end of the magazine and including a channel from which consecutive fasteners from the magazine are driven.

Other features and aspects of the invention will become apparent by consideration of the following detailed description and accompanying drawings.

BRIEF DESCRIPTION OF THE DRAWINGS

FIG. 5B is another perspective view of the magazine of FIG. 1A.

FIG. 5C1 is another perspective view of the magazine of FIG. 1A.

FIG. 5C2 is a cross-sectional view of a portion of a magazine for use with the gas spring-powered fastener driver of FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
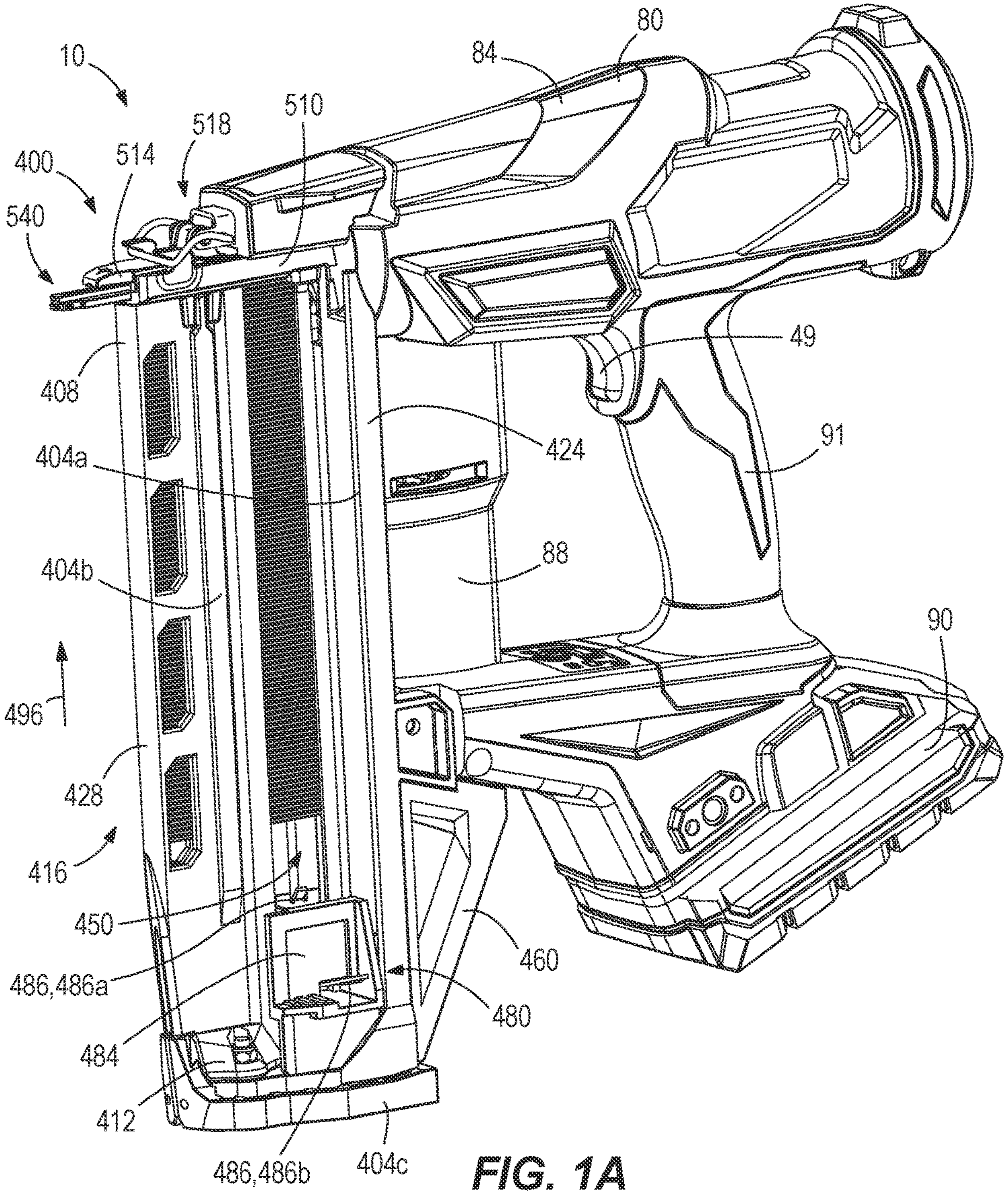
FIG. 1A is perspective view of a gas spring-powered fastener driver including a magazine and a workpiece contact assembly in accordance with an embodiment of the invention.
Figure 1B:
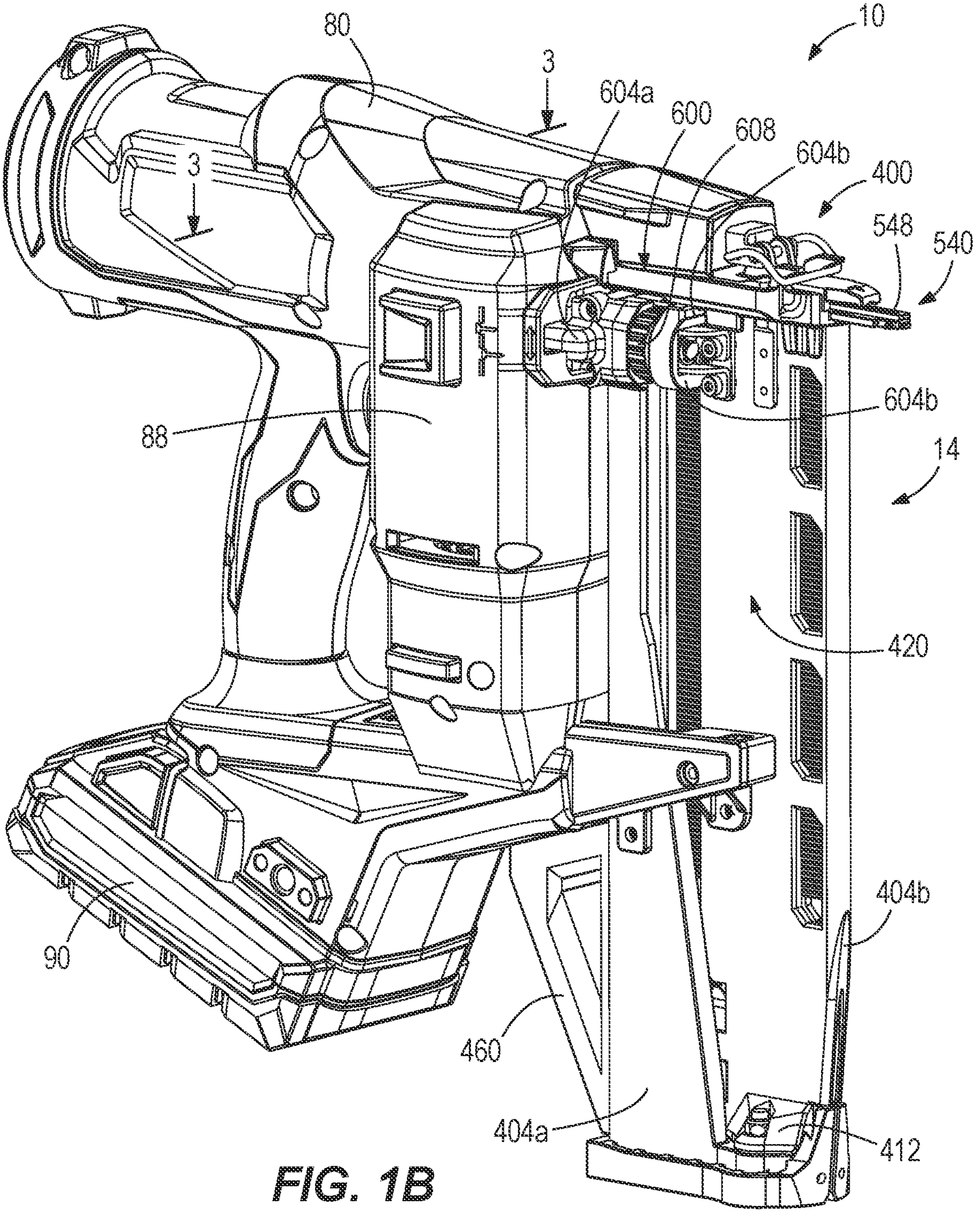
FIG. 1B is another perspective view of the gas spring-powered fastener driver of FIG. 1A further illustrating a depth of drive adjustment assembly.
Figure 3:
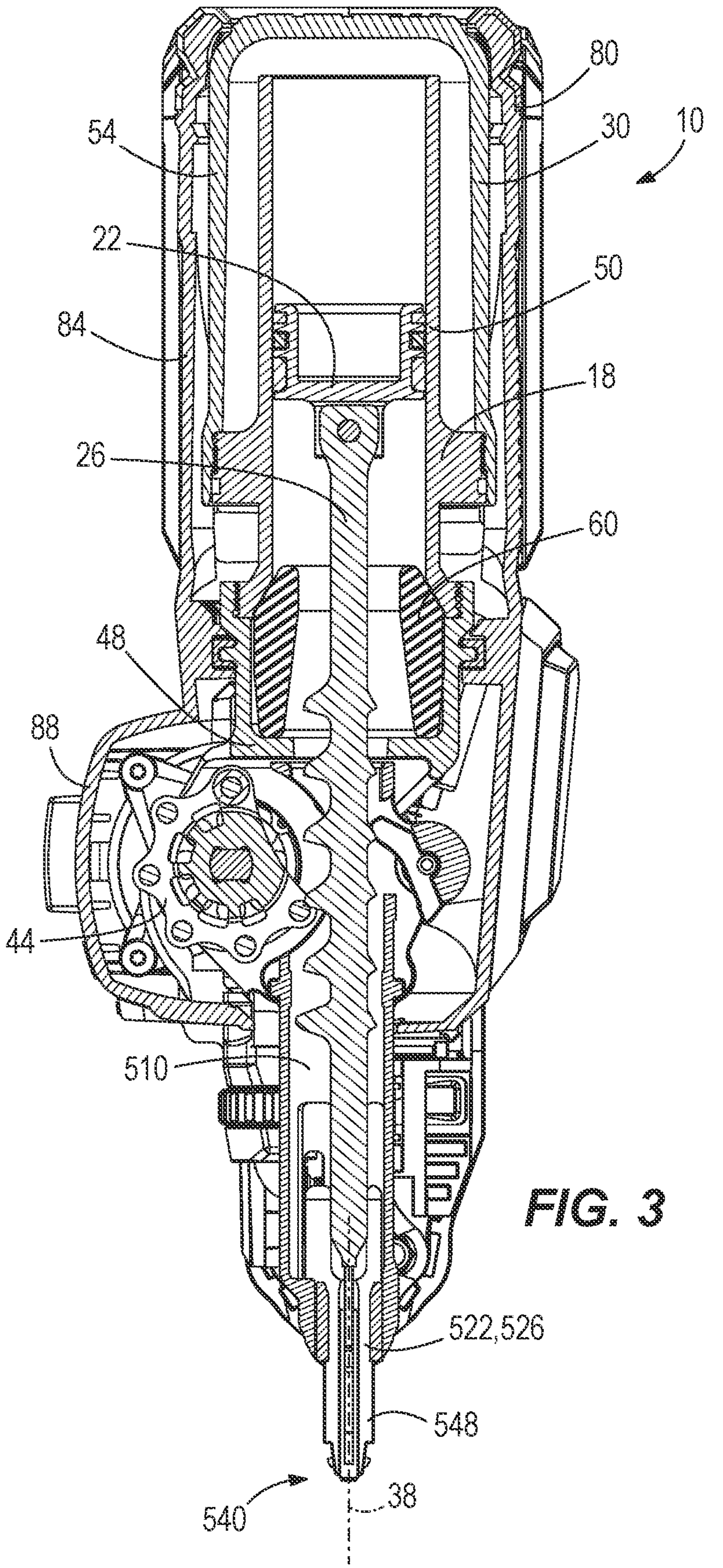
FIG. 3 is a cross-sectional view of the gas spring-powered fastener driver of FIG. 1A taken along the line 3-3 of FIG. 1B.

With reference to FIGS. 1A and 1B, a gas spring-powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIGS. 3-4B). With reference to FIG. 3-4B, the fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the cylinder 18. In the illustrated embodiment, the cylinder 18 and moveable piston 22 are positioned within the storage chamber cylinder 30. The driver 10 further includes a fill valve (not shown) coupled to the storage chamber cylinder 30. When connected with a source of compressed gas, the fill valve permits the storage chamber cylinder 30 to be refilled with compressed gas if any prior leakage has occurred. The fill valve may be configured as a Schrader valve, for example.

Figure 2:
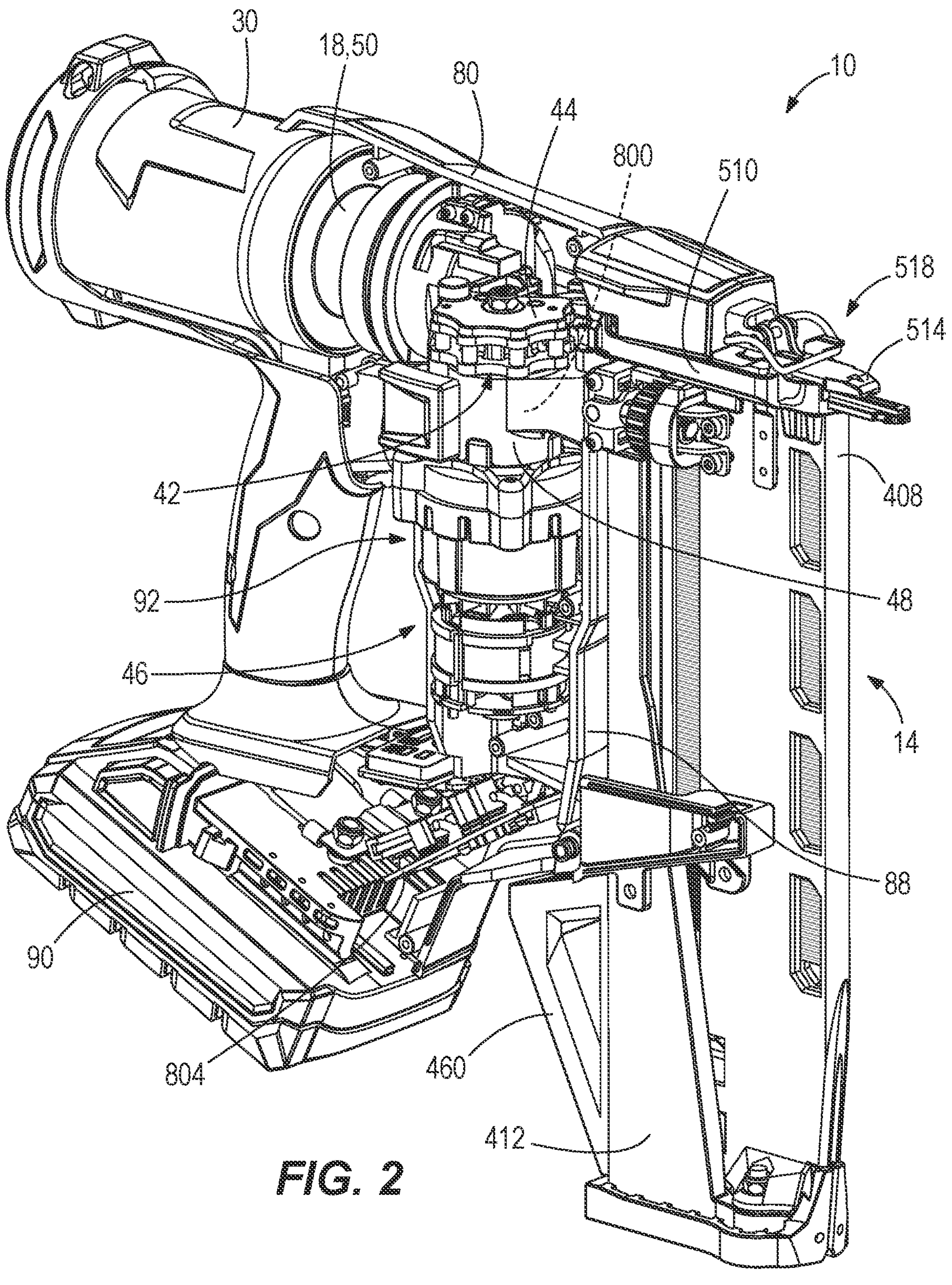
FIG. 2 is another perspective view of the gas spring-powered fastener driver of FIG. 1A with a portion removed.
Figure 4A:
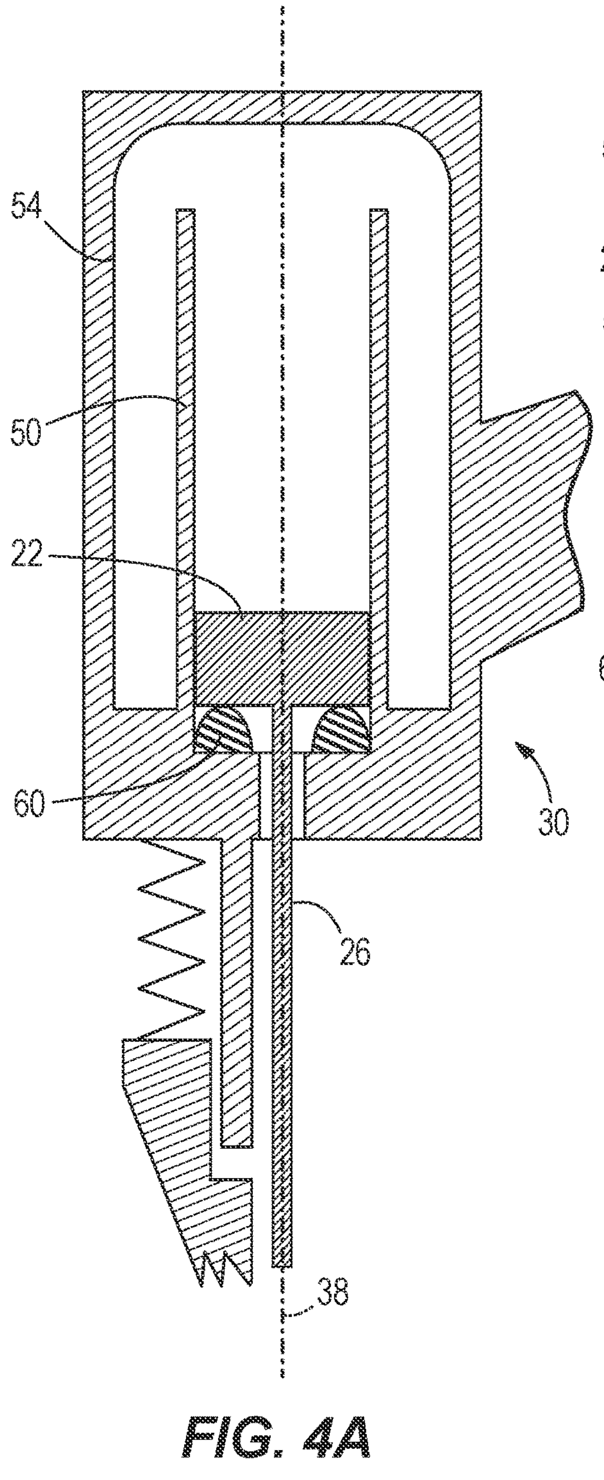
FIG. 4A is a schematic view of the gas spring-powered fastener driver of FIG. 1A, illustrating a driver blade in a driven or bottom-dead-center position.
Figure 4B:
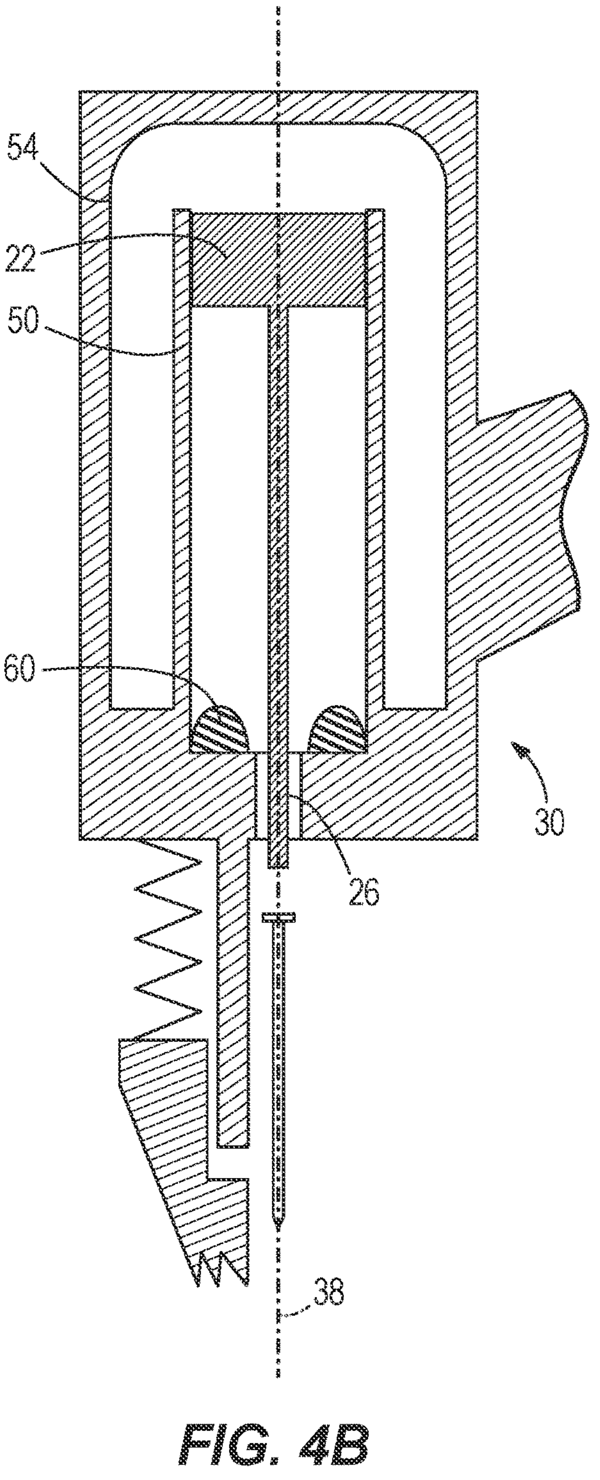
FIG. 4B is a schematic view of the gas spring-powered fastener driver of FIG. 1A, illustrating a driver blade in a top-dead-center position.

With reference to FIGS. 4A-4B, the cylinder 18 and the driver blade 26 define a driving axis 38. During a driving cycle, the driver blade 26 and piston 22 are moveable between a top-dead-center (TDC) position (FIG. 4B) and a driven or bottom-dead-center (BDC) position (FIG. 4A). With respect to FIGS. 2 and 3, the fastener driver 10 further includes a lifting assembly 42 (FIG. 2), which has a lifter 44 that is powered by a motor 46 (FIG. 2) and that moves the driver blade 26 from the driven position to the TDC position. As shown in FIGS. 2 and 3, in the illustrated embodiment, the cylinder 18 is defined in part by an inner frame 48 (e.g., inner housing). Specifically, the inner frame 48 is coupled to the cylinder 18. Further with respect to FIGS. 2 and 3, the inner frame 48 also supports, at least in part, the lifting assembly 42 and the motor 46. The inner frame 48 is constructed from a material that is more robust than plastic, such as metal.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC or driven positions, until being released by user activation of a trigger 49 (FIG. 1A). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

With reference to FIGS. 3-4B, the storage chamber cylinder 30 surrounds the cylinder 18. The cylinder 18 has an annular inner wall 50 configured to guide the piston 22 and driver blade 26 along the driving axis 38 to compress the gas in the storage chamber cylinder 30. As shown with respect to FIGS. 2-3, the inner frame 48 is coupled to the annular inner wall 50 of the cylinder 18. The storage chamber cylinder 30 has an annular outer wall 54 circumferentially surrounding the annular inner wall 50. As such, the cylinder 18 is configured to be axially secured to the storage chamber cylinder 30.

With reference to FIGS. 3-4B, the driver 10 includes a bumper 60 supported by the inner frame 48 and positioned beneath the piston 22 for stopping the piston 22 at the driven position (FIG. 4B) and absorbing the impact energy from the piston 22. The bumper 60 is configured to distribute the impact force of the piston 22 uniformly throughout the bumper 60 as the piston 22 is rapidly decelerated upon reaching the driven position (i.e., the bottom dead center position).

Figure 1C:
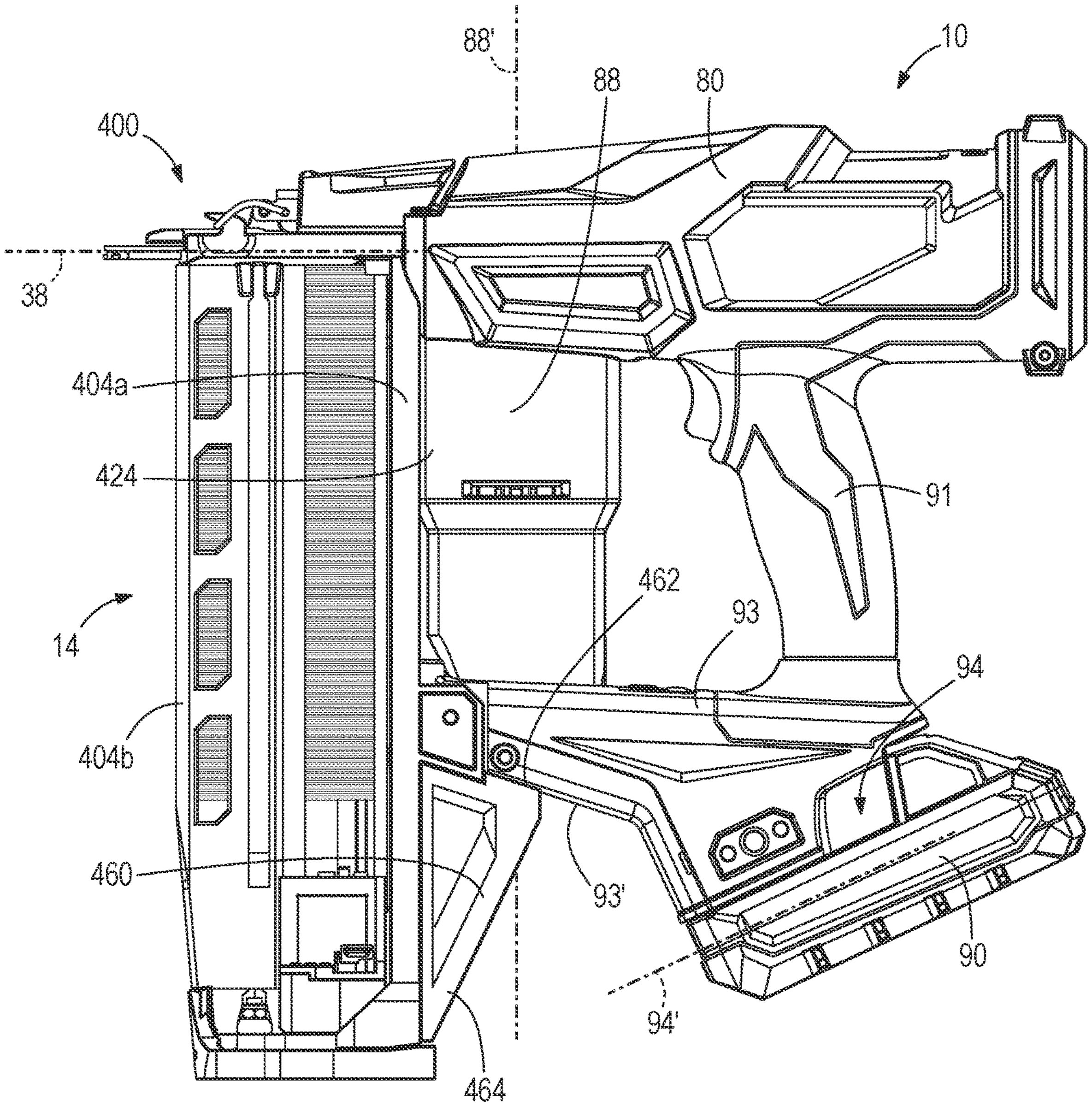
FIG. 1C is a side view of the gas spring-powered fastener driver of FIG. 1A.

With reference to FIG. 1A, the driver 10 includes a housing 80 having a cylinder support portion 84 in which the storage chamber cylinder 30 is at least partially positioned, a drive unit support portion 88 in which the motor 46 and a transmission 92 (FIG. 2) are at least partially positioned, a handle portion 91, and a battery support portion 93. Additionally, in the illustrated embodiment, the cylinder support portion 84 and the battery support portion 93 are spaced apart from one another and extend between the drive unit support portion 88 and the handle portion 91. Accordingly, the drive unit support portion 88 and the handle portion 91 are spaced apart from one another. As shown in FIG. 1C, the drive unit support portion 88 extends along a drive unit support axis 88' that intersects the driving axis 38. The battery support portion 93 has an angled surface 93' that is positioned at a non-parallel and non-perpendicular angle relative to the drive unit support axis 88'. Moreover, a battery attachment interface 94 defines an insertion axis 94' that is not parallel or perpendicular to driving axis 38 or the drive unit support axis 88'. In the illustrated embodiment, the cylinder support portion 84, the drive unit support portion 88, the handle portion 91, and the battery support portion 93 are integrally formed with one another as a single piece (e.g., using a casting or molding process, depending on the material used). Moreover, the housing 80 is formed from a plastic material. The inner frame 48 is thus made from a harder, stronger, more robust material (e.g., metal) than the material (e.g., plastic) used to form the housing 80.

As described below in further detail, the transmission 92 raises the driver blade 26 from the driven position to the ready position. With reference to FIG. 1A-3, the motor 46 is positioned within the drive unit support portion 88 for providing torque to the transmission 92 when activated. A battery pack 90 is received and supported by a battery pack attachment interface of the handle portion 91. The battery pack 90 is electrically connectable to the motor 46 for supplying electrical power to the motor 46. In alternative embodiments, the driver may be powered from an alternative power source such as an AC voltage input (i.e., from a wall outlet), or by an alternative DC voltage input (e.g., an AC/DC converter). With reference to FIG. 2, the transmission 92 provides torque to the lifter 44 from the motor 46.

The operation of a firing cycle for the driver 10 is illustrated and detailed below. With reference to FIGS. 4B, prior to initiation a firing cycle, the driver blade 26 is held in the ready position with the piston 22 near top dead center within the cylinder 18. Upon the trigger 49 being pulled to initiate a firing cycle, the motor 46 is activated to rotate the lifter 44 in a counter-clockwise direction from the frame of reference of FIG. 2, thereby displacing the driver blade 26 upward to the TDC position of the driver blade 26. Thereafter, the piston 22 and the driver blade 26 are thrust downward toward the driven position (FIG. 4A) by the expanding gas in the cylinder 18 and storage chamber cylinder 30. As the driver blade 26 is displaced toward the driven position, the motor 46 remains activated to continue counter-clockwise rotation of the lifter 44. Upon a fastener being driven into a workpiece, the piston 22 impacts the bumper 60 to quickly decelerate the piston 22 and the driver blade 26, eventually stopping the piston 22 in the driven or bottom dead center position. Shortly after the driver blade 26 reaches the driven position, continued counter-clockwise rotation of the lifter 44 raises the driver blade 26 and the piston 22 toward the ready position.

With reference to FIGS. 1A-2 and 5A-6B, the driver 10 further includes a nosepiece assembly 400 positioned at an end of the magazine 14. With reference to FIGS. 1A and 2, the nosepiece assembly 400 is positioned at a first end 408 of the magazine 14. The nosepiece assembly 400 generally includes a first, base portion 510 coupled to the first end 408 of the magazine 14 and a second, cover portion 514 coupled to the base portion 510. The base portion 510 of the nosepiece assembly 400 is fixed to the magazine 14. The cover portion 514 of the nosepiece assembly 400 substantially covers the base portion 510. In the illustrated embodiment, the cover portion 514 is pivotally coupled to the base portion 510 by a latch mechanism 518. The nosepiece assembly 400 cooperatively defines a firing channel 522 (only a portion of which is shown in FIG. 3) extending along the driving axis 38. The driver blade 26 is received in the firing channel 522 for driving the fastener from the firing channel 522, out the distal end of the nosepiece assembly 400, and into a workpiece, as discussed above.

Figure 5A:
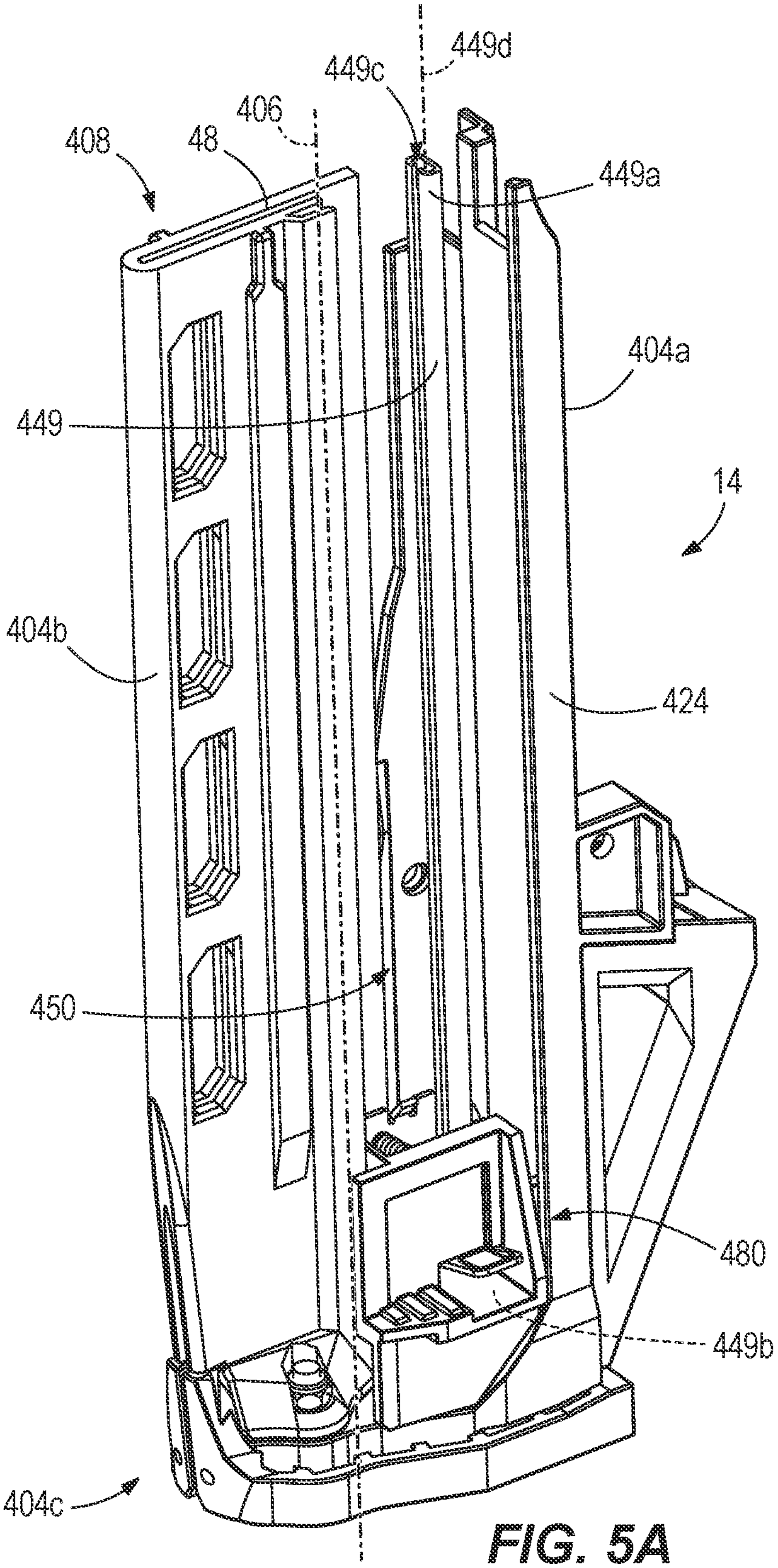
FIG. 5A is a perspective view of the magazine of FIG. 1A having a support member.

The magazine 14 is configured to receive the fasteners to be driven into the workpiece by the powered fastener driver 10. The magazine 14 includes a first portion 404*a* and a second portion 404*b* coupled to one another by fasteners. The magazine 14 (FIGS. 1A, 5A-5B) has the first end 408 and a second end 412 opposite the first end 408. A longitudinal axis 406 is defined between the first end 408 and the second end 412. A cover 404*c* is coupled to both the first portion 404*a* and the second portion 404*b* at the second end 412 of the magazine 14. In the illustrated embodiment, the first portion 404*a*, the second portion 404*b*, and the cover 404*c* constitute the magazine 14. In other embodiments, the magazine 14 may be formed as a single unitary piece. A first side 416 and a second side 420 of the magazine 14 are each formed at least partially from both the first portion 404*a* and the second portion 404*b*. A top side 424 of the magazine 14 is defined by the first portion 404*a* and a bottom side 428 of the magazine 14 is defined by the second portion 404*b*. Additionally, the first portion 404*a* and the second portion 404*b* cooperatively define a fastener channel 448 extending from the first end 408 to proximate the second end 412 of the magazine 14. The fastener channel 448 is configured to receive the fasteners. The fastener channel 448 is in communication with the firing channel 522 (e.g., by an opening 526 in the base portion 510) for delivering a fastener from the magazine 14 to the nosepiece assembly 400. In some embodiments, a guide 449 (FIG. 5A) is positioned within the first portion 404*a* and is configured to receive and guide a portion (e.g., a head) of the fasteners. In the embodiment of FIG. 5A, the guide 449 includes a first end 449*a* positioned at or adjacent to the first end 408 and a second end 449*b* positioned adjacent to the second end 412. The guide 449 has a longitudinal axis 449*d*. A guide 449 defines a channel 449*c* extending from the first end to the second end along the longitudinal axis 449*d*, and the channel 449*c* is configured to receive and guide the head of the fastener. In the embodiment of FIG. 5A, the longitudinal axis 449*d* of the guide 449 is parallel to the longitudinal axis 406 of the magazine 14. Also, in the embodiment of FIG. 5A, the guide 449 and the channel 449*c* are oriented substantially parallel to a plane P1 (FIGS. 5B and 6B) of the top side 424. A gap or track 450 is defined on the second side 420 between the first portion 404*a* and the second portion 404*b*. The track 450 extends along the length of the magazine 14 from proximate the second end 412 toward the first end 408.

Figure 5D:
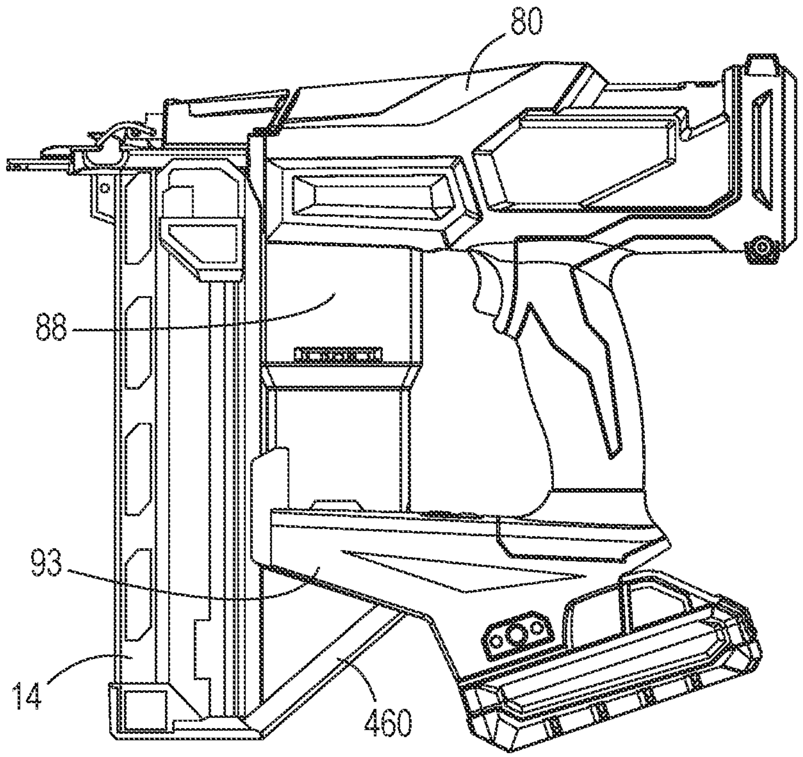
FIG. 5D is a side view of a powered fastener having a magazine with a support member having another configuration.
Figure 5E:
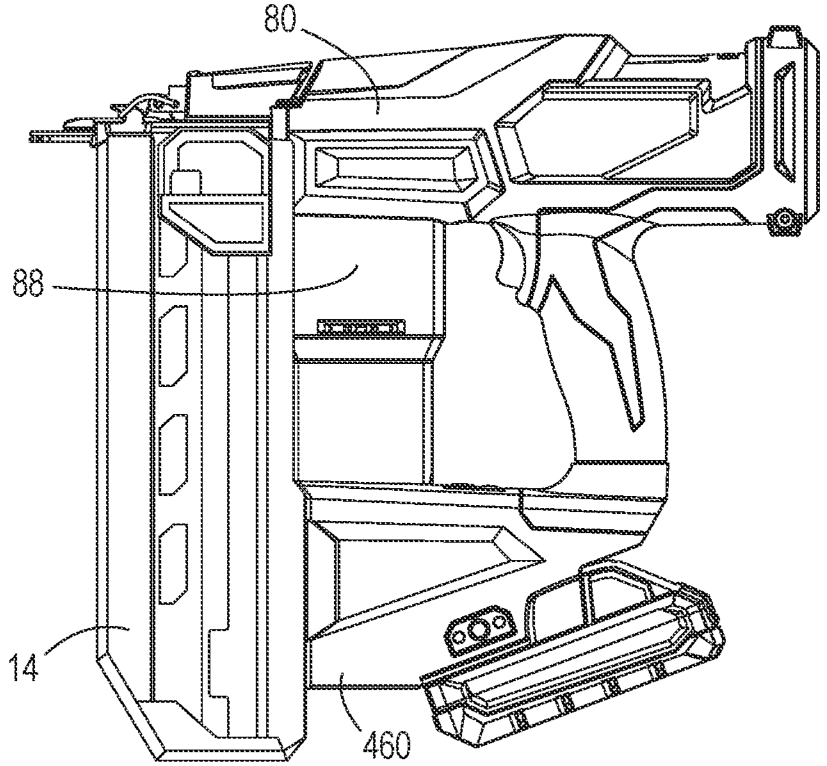
FIG. 5E is a side view of a powered fastener having a support member that contacts a magazine having another configuration.

As shown in at least FIGS. 1A-1B and 5A-5C2, the magazine 14 includes a support member 460 that extends therefrom. In the illustrated embodiment, shown in detail in FIGS. 5A-5C2, the support member 460 is integrally formed with the first portion **404*a* and extends from the top side 424 of the magazine 14. The support member 460 is coupled to the housing 80, and specifically the drive unit support portion 88, via fasteners or the like. Accordingly, the magazine 14 is fixed coupled to the housing 80 via the support member 460. In the illustrated embodiment, the support member 460 is generally polygonal in shape. That is, the support member 460 includes a first side 462 extending from the top side 424 of the magazine 14 at a location between the first end 408 and the second end 412 and a second side 464 extending from the top side 424 of the magazine 14 at a location at or adjacent to the second end 412. The first side 462 extends from the top side 424 at a first angle and the second side 464 extends from the top side 424 at a second, different angle. Neither the first angle nor second angle is perpendicular to the plane P1 defined by the top side 424 of the magazine. The first side 462 abuts a surface of the housing 80 of the driver 10. In the illustrated embodiment, the first side 462 abuts the angled surface 93' of the battery support portion 93. One or more projections 466, each having an aperture 468 extending therethrough, extend from the first side 462. Each of the apertures 468 is configured to align with an aperture in the housing 80 for receiving a fastener therethrough. In the illustrated embodiment, one of the projections 466 extends into the housing 80, while the other of the projections 466 remains outside of the housing 80. In the illustrated embodiment, an aperture 470 (FIG. 5A) extends through the support member 460, but in other embodiments, this aperture 470 may be filled in. In the illustrated embodiment, the support member 460 includes a reinforcement 469 positioned (e.g., embedded) therein. In the illustrated embodiment, the reinforcement 469 is formed of metal. Additionally in the illustrated embodiment, the reinforcement 469 is positioned at least partially within the first side 462 and within one of the projection 466. In other embodiments, the reinforcement 469 may be at least partially positioned within each of the first and second sides 462, 464 of the magazine support 460 and/or in one or both projections 466. As shown in FIGS. 5D and 5E, the support member 460 may have other configurations. In some embodiments, for example FIG. 5D, the support member 460 may be an arm that extends from the top side 424 and engages the housing 80. In some embodiments, for example FIG. 5E, the support member 460 may be formed with and extend from the housing 80 to engage the magazine 14. Regardless of the configuration, the support member 460 supports and stabilizes the magazine 14 relative to the driver 10. Although not illustrated, a reinforcement 462 may be embedded (or otherwise positioned within) within the support members 460 of FIGS. 5D and 5E**.

With renewed reference to FIG. 1A, the magazine 14 further includes a pusher assembly 480. The pusher assembly 480 is slidably coupled to the magazine 14 and configured to bias the fasteners in the magazine 14 toward the nosepiece assembly 400. The illustrated pusher assembly 480 includes a first portion or pusher body 484 and a pusher finger 486 pivotably coupled to the pusher body 484. The pusher finger 486 has a first end **486*a* that engages the fasteners in the fastener channel 448 and a second end 486*b* that is an actuator for moving the first end 486*a* into and out of the fastener channel 448. The pusher assembly 480 further includes a spring assembly (not shown) that is configured to exert a biasing force on the pusher assembly 480 for moving the pusher assembly 480 in the direction of arrow 496**.

Figure 6A:
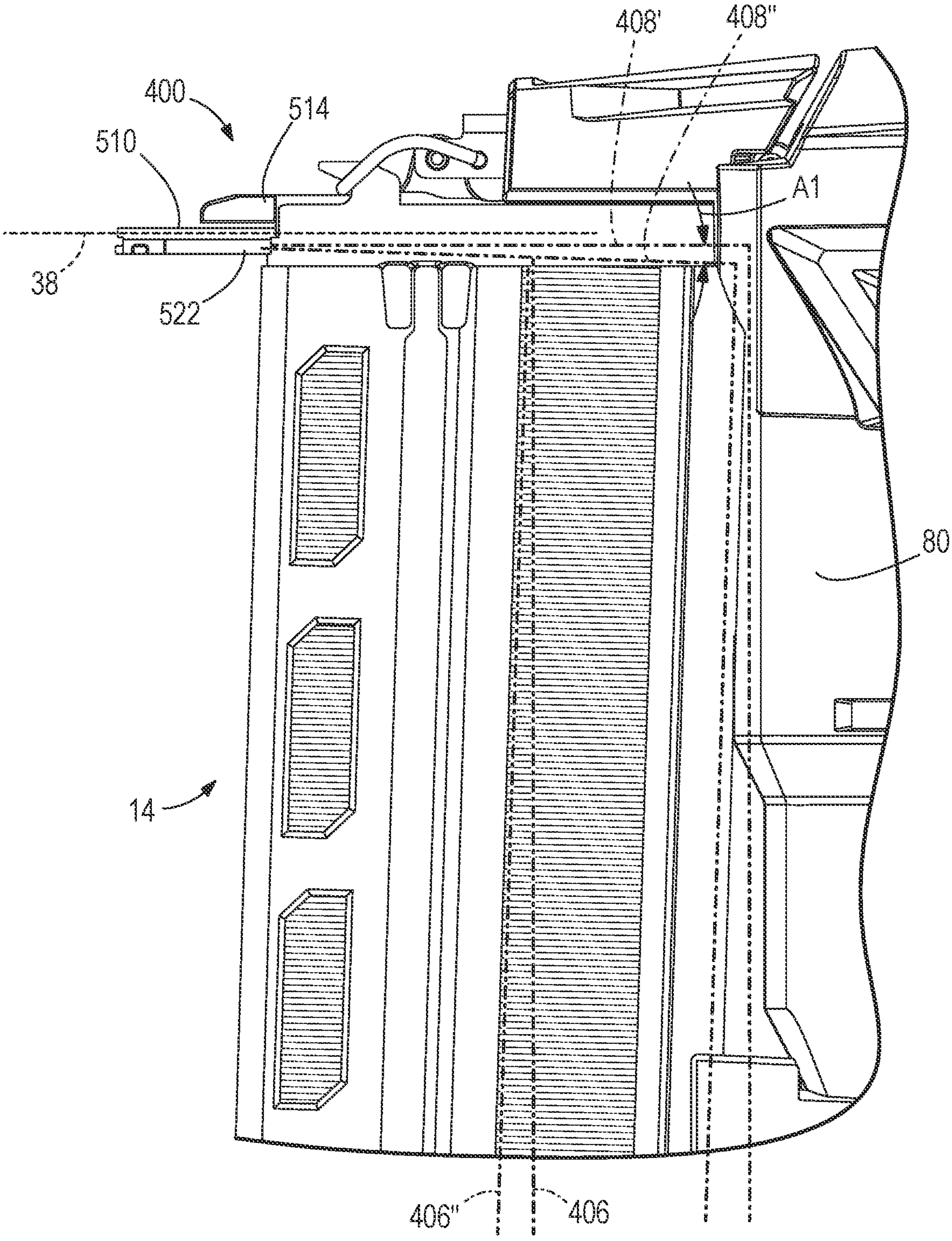
FIG. 6A is a schematic view of the magazine of FIG. 1A.

In the illustrated embodiment, the magazine 14 is a straight magazine and the fasteners are transported within the magazine along the longitudinal axis 406. Therefore, as shown in FIGS. 1A-1C, the magazines 14 and the longitudinal axes 406 thereof extend generally perpendicular to the nosepiece assembly 400 and the driving axis 38. That is, a surface 408' of the first end 408 extends generally parallel to the driving axis 38. In some embodiments, as shown in FIG. 6A, the magazine 14 is "tilted" relative to the nosepiece assembly 400 by a "pre-tilt angle" A1, such that the magazine 14 and the longitudinal axis 406" thereof is obliquely oriented relative to the nosepiece assembly 400. That is, at least a portion of a surface 408" of the first end 408 extends at a generally non-parallel angle relative to the driving axis 38. Accordingly, the magazine 14 is inclined relative to the firing channel 522 (and the driving axis 38) with the second end 412 being further from the housing 80 (e.g., the drive unit support portion 88) than the first end 408 in a direction parallel to the driving axis 38. Accordingly, the second end 412 is closer to the workpiece than the first end 408. To accomplish this, in one embodiment, some material is shaved off (or otherwise removed from) the first end 408 to create the pre-tilt angle A1 e.g., approximately two degrees in the embodiment of FIG. 6A, between the magazine 14 and the nosepiece assembly 400. Approximately as used herein is inclusive of manufacturing tolerances. In other embodiments, the pre-tilt angle may be less than approximately three degrees. In other words, the pre-tilt angle A1 causes the fasteners to move through the magazine 14 and the next fastener to be fired to enter the firing channel 522 at the pre-tilt angle A1. The contact between the tip of the fastener and the nosepiece assembly 400 causes the fastener to begin to straighten before firing. Unlike other straight magazines, in this embodiment, there is no additional mechanism that helps straighten the fastener when the fastener is relatively longer because it is not needed on this straight magazine design. The tilted orientation of the straight magazine 14 is advantageous because it facilitates guiding of the fastener into the firing channel 522, and it is a way of locating the next fastener to be fired in a predetermined location in the firing channel 522, thereby increasing consistency of firing and causing better performance of the tool (e.g., the fastener is fired more consistently closer to where the user wants it than without the pre-tilt).

Figure 6B:
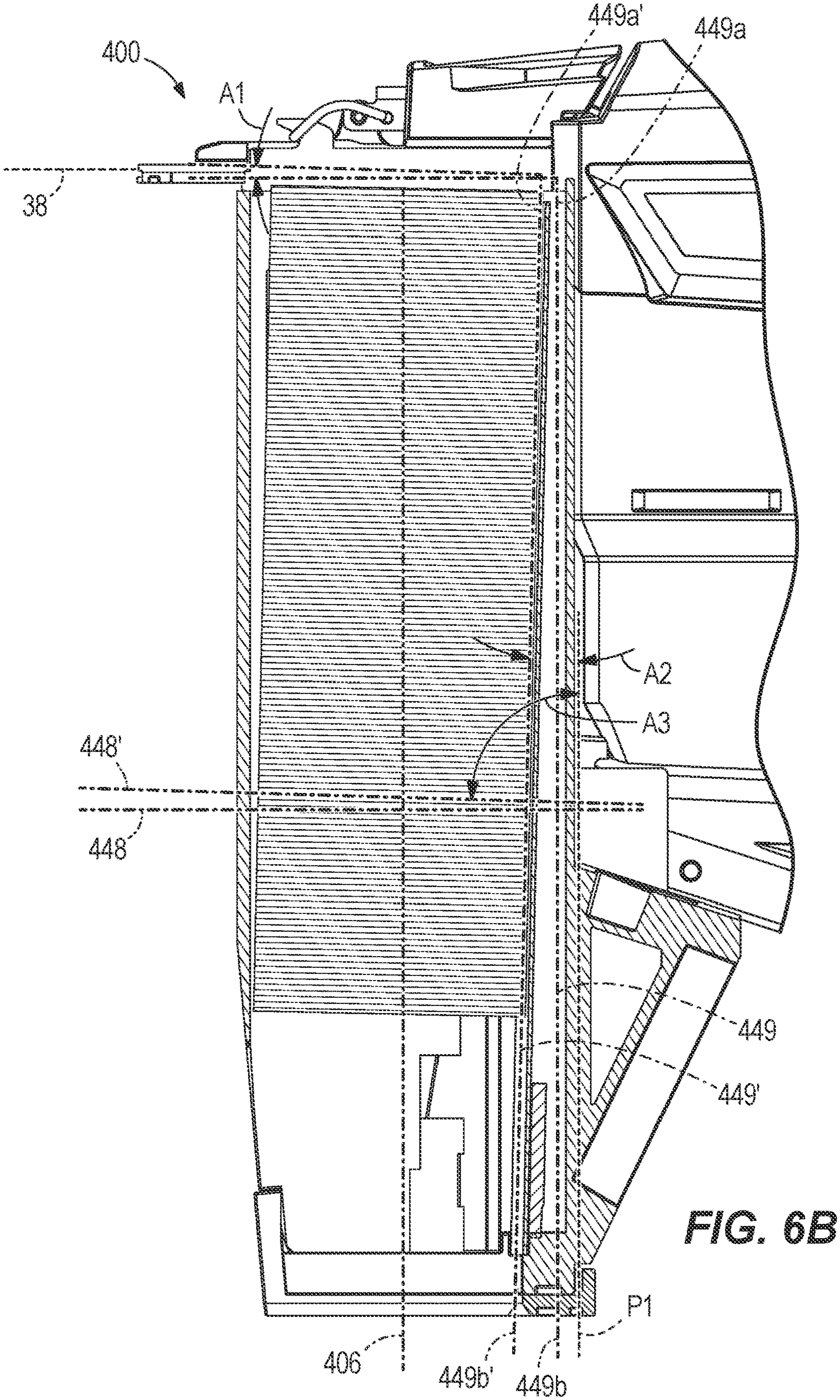
FIG. 6B is a schematic view of another magazine for use with the gas spring-powered fastener driver of FIG. 1A.
Figure 7:
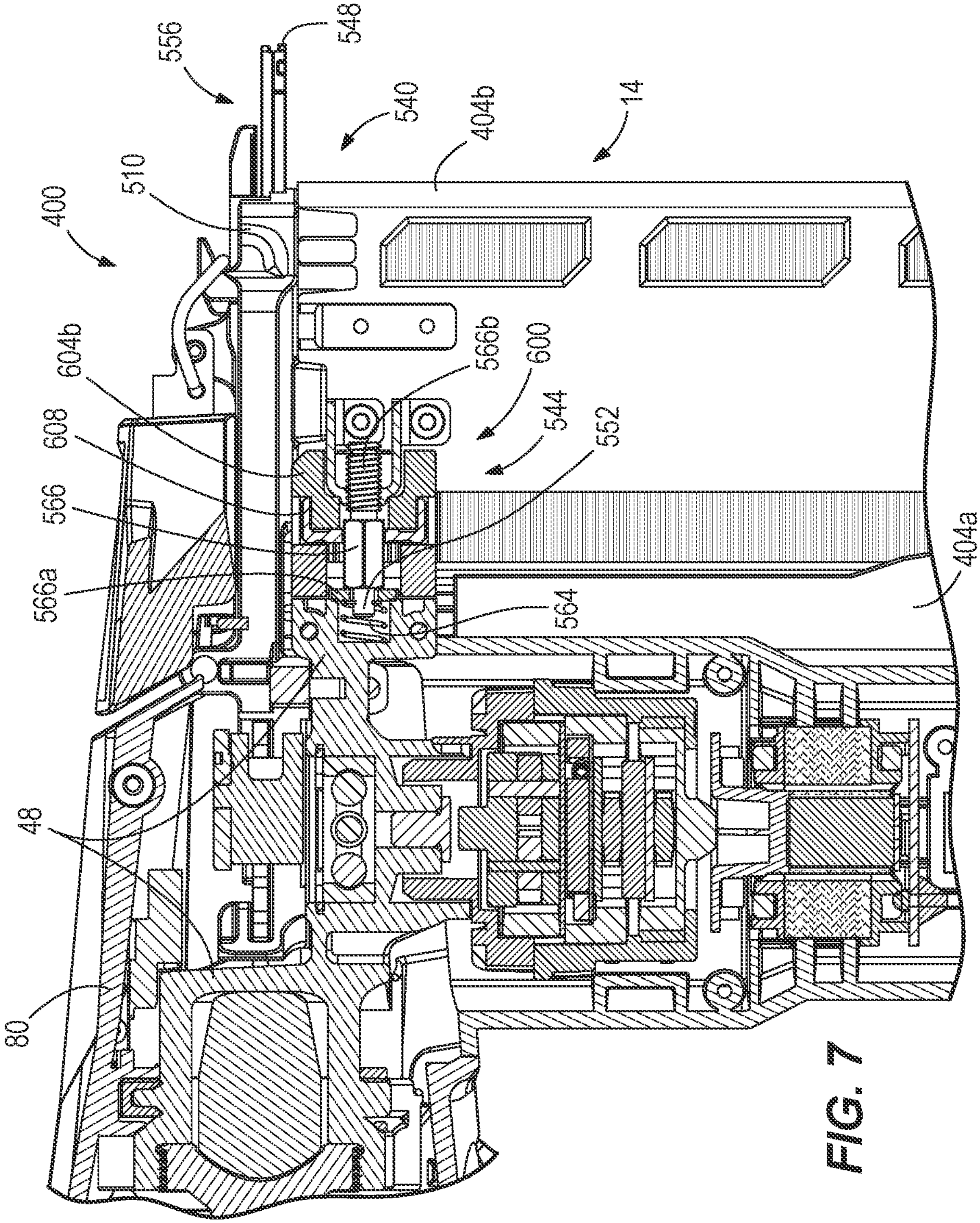
FIG. 7 is a cross-sectional view of the gas spring-powered fastener driver of FIG. 1A taken along the line 7-7 of FIG. 1B.
Figure 8:
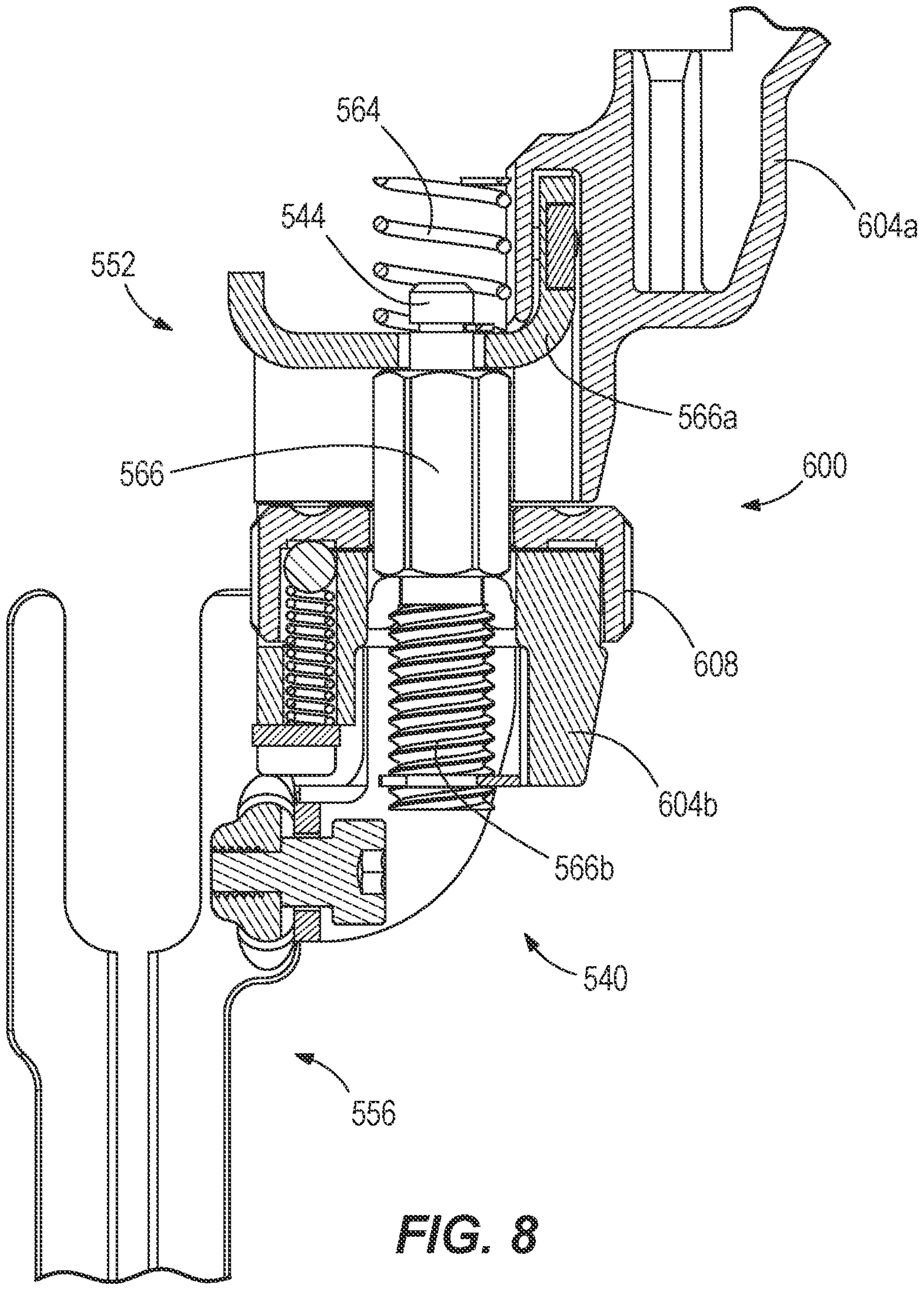
FIG. 8 is a perspective view of the workpiece contact assembly and the depth of drive adjustment assembly of FIG. 1A.
Figure 9:
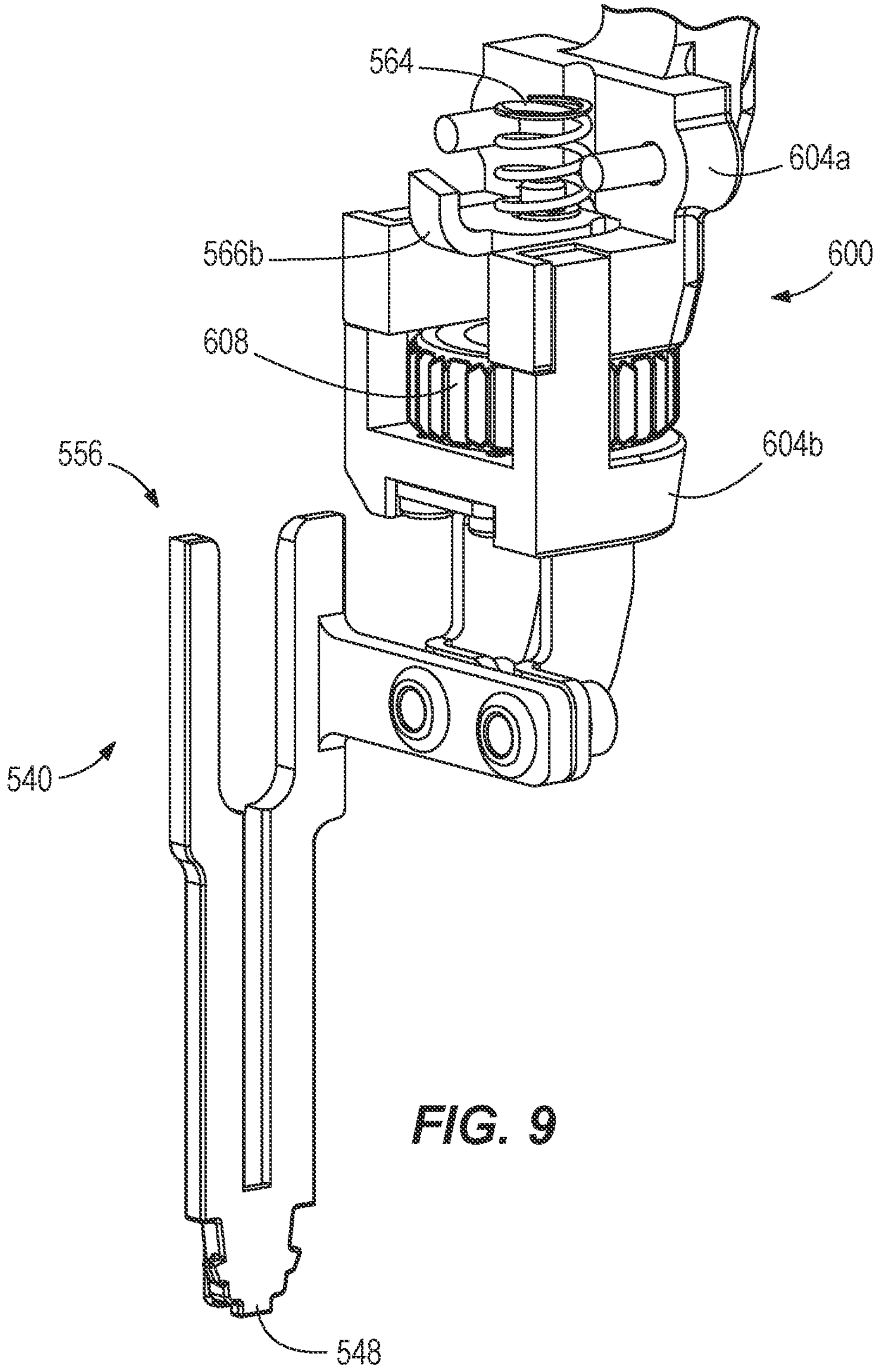
FIG. 9 is another perspective view of the workpiece contact assembly and the depth of drive adjustment assembly of FIG. 1A.
Figure 11:
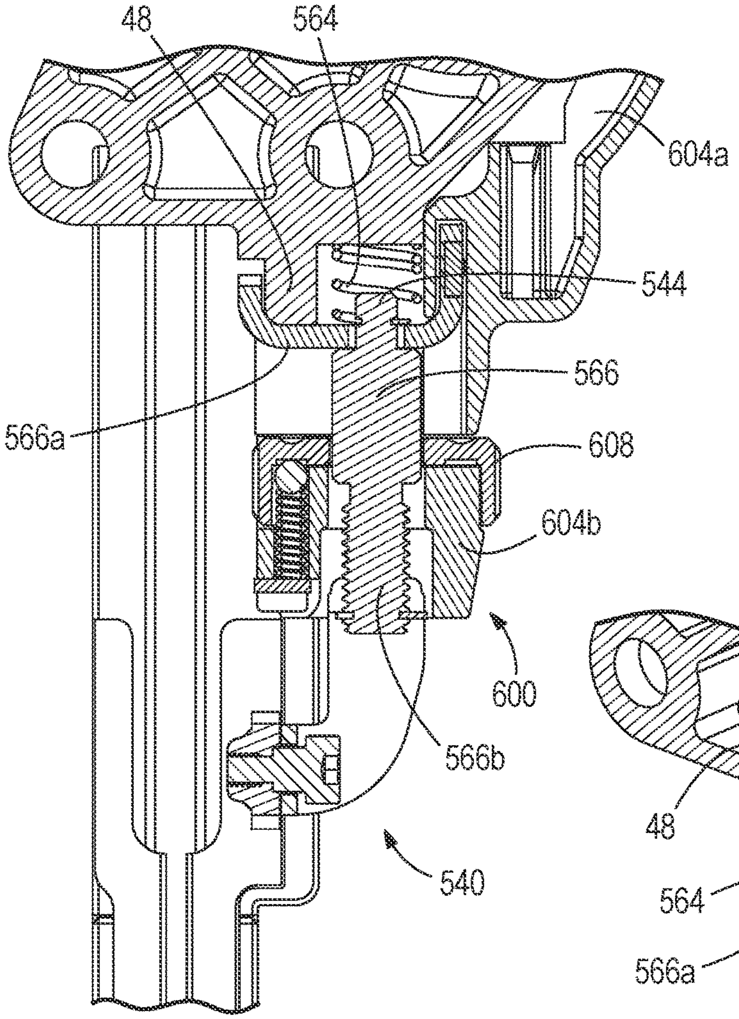
FIG. 11 is a cross-sectional view of the workpiece contact assembly and the depth of drive adjustment assembly of FIG. 1A.
Figure 10:
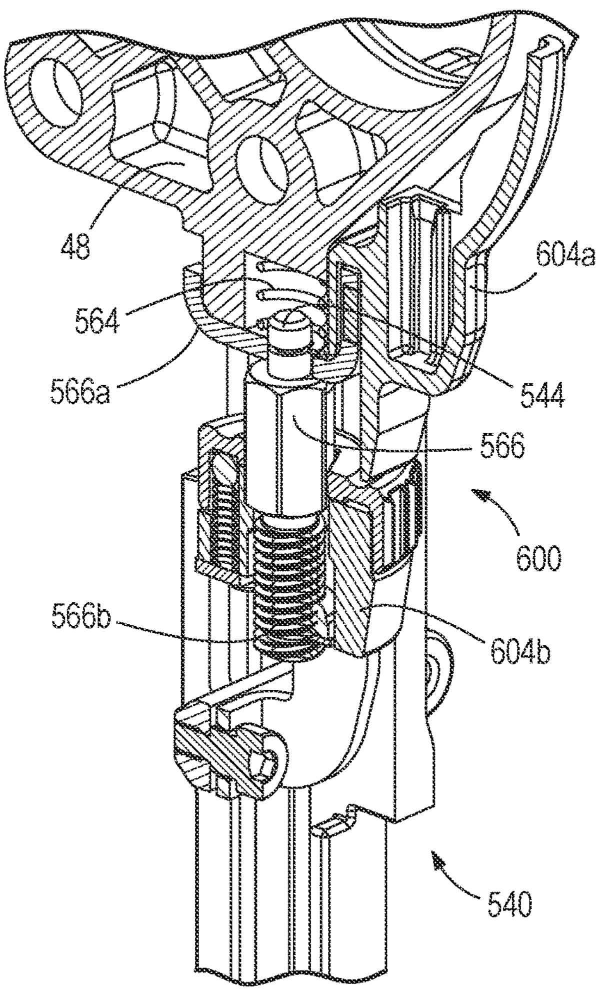
FIG. 10 is another perspective view of the workpiece contact assembly and the depth of drive adjustment assembly of FIG. 1A.

The fasteners may be positioned within the magazine 14 at the pre-title angle A1 in other ways. For example, as shown in FIG. 6B, in some embodiments, the guide 449' is "tilted" relative to the magazine 14 (e.g., the top side 424 of the magazine 14) by an angle A2, such that the guide 449' is obliquely oriented relative to the magazine 14 (e.g., the top side 424 of the magazine 14). That is, at least a portion of the guide 449' extends at a generally non-parallel angle relative to the plane P1 of the top side 424 and the longitudinal axis 406. That is, the longitudinal axis **449*d'* is also positioned at a non-parallel angle relative to the plane P1 and the longitudinal axis 406. Accordingly, the guide 449' is inclined relative to the magazine 14 with a second end 449*b'* being further from top side 424 than a first end 449*a'* in a direction parallel to the driving axis 38. Accordingly, the second end 449*b'* is closer to the workpiece than the first end 449*a'*. Correspondingly, the fastener channel 448' of the magazine 14 may be configured to orient the fasteners at a non-perpendicular angle A3 relative to the plane P1 of the top side 424 and the longitudinal axis 406 such that the fasteners are oriented within the channel at the pre-tilt angle A1 relative to the driving axis 38. In other words, the fastener channel 448' of the magazine is configured such that when fasteners are loaded, they are orientated at pre-tilt angle A1 relative to the firing channel 522 and the driving axis 38, as well as being oriented at the angle A3 relative to the longitudinal axis 406 and the plane P1 of the top side of the magazine 14. This is because the heads of the fasteners are received in the channel 449***c*' of the tilted guide 449', which orients the fasteners at the pre-tilt angle A1 within the magazine 14 such that they are advanced along the longitudinal axis 406 at the angle A3 (rather than perpendicular to the longitudinal axis 406 in the magazine 14 of FIG. 5A). In the illustrated embodiment, the angle A2 measure 1 degree, but in other embodiments the angle A2 may measure between 0.5 degree and 3 degrees.

With reference to FIGS. 7-11, the driver 10 includes a workpiece contact assembly 540 extending along one side of the nosepiece assembly 400. The workpiece contact assembly 540 includes a first end 544 (FIGS. 7, 8, 10, and 11) and a second, opposite end 548 (FIGS. 7 and 9) that is engageable with a workpiece during a firing operation. The workpiece contact assembly 540 includes a plurality of sections 552, 556. Each section 552, 556 is formed by a plurality of interconnected segments. A spring 564 (e.g., a biasing element) is configured to bias the workpiece contact assembly 540 toward an extended position. The workpiece contact assembly 540 is configured to be moved from the extended position toward a retracted position (shown in FIGS. 7, 10, 11) when the workpiece contact assembly 540 is pressed against a workpiece. In the retracted position, the first end 544 of the workpiece contact assembly 540 is configured to actuate an electronic switch 800, which, in turn, provides an input signal to a controller of the printed circuit board 804, indicating that the nosepiece assembly 400 is against or proximate a workpiece and ready to be fired.

A first section 552 of the workpiece contact assembly 540 is positioned closer to the top side 424 of the magazine 14 rather than the bottom side 428. The first section 552 includes the first end 544 of the workpiece contact assembly 540. The first section 552 includes an arm 566 that is movable relative to the housing 80 and nosepiece assembly 400. The arm 566 includes an engagement portion 566*a* and a screw portion 566*b*. The spring 564 surrounds the arm 566 and is positioned between the inner frame 48 and the engagement portion 566*a*. The second section 556 includes the second end 548 that is configured to engage a workpiece. The first and second sections 552, 556 are coupled together by a depth of drive adjustment mechanism 600, which adjusts the effective length of the workpiece contact assembly 540. In particular, the screw portion 566*b* couples the first section 552 to the second section 556.

With reference to FIGS. 7-11, the depth of drive adjustment mechanism 600 includes support members 604*a*, 604*b*, an adjustment knob 608, and the screw portion 566*b*. The support members 604*a*, 604*b* supports the arm 566. One of the support members 604*a* is at least partially positioned within the housing 80 and supported by the inner frame 48. One of the support members 604*b* is supported by the other support member 604*a*. The adjustment knob 608 is positioned between the support members 604*a*, 604*b* and is rotatably supported upon the arm 566. As noted above, the screw portion 566*b* extends between the first section 552 and the second section 556 of the workpiece contact assembly 540. One end of the second section 556 is threadably coupled to the screw portion 566*b*. Furthermore, the arm 566, and therefore the screw portion 566*b*, are coupled for co-rotation with the adjustment knob 608. Accordingly, the screw portion 566*b* and the adjustment knob 608 are rotatably supported by the arm 566. Rotation of the adjustment knob 608 axially threads the second section 556 along the screw portion 566*b* for adjusting a protruding length of the workpiece contact assembly 540 relative to the distal end of the nosepiece assembly 400. More specifically, rotation of the adjustment knob 608 moves the second section 556 relative to the first section 552 for adjusting an effective length of the workpiece contact assembly 540. As such, the adjustment knob 608 may be termed as an actuator.

The depth of drive adjustment mechanism 600 adjusts the depth to which a fastener is driven into the workpiece. In particular, the depth of drive adjustment mechanism 600 adjusts the length that the workpiece contact assembly 540 protrudes relative to the distal end of the nosepiece assembly 400, thereby changing the distance between the distal end of the nosepiece assembly 400 and the workpiece contact assembly 540 in the extended position. In other words, the depth of drive adjustment mechanism 600 adjusts how far the workpiece contact assembly 540 extends past the nosepiece assembly 400 for abutting with a workpiece. The larger the gap between the distal end of the nosepiece assembly 400 and the workpiece, the shallower the depth a fastener will be driven into the workpiece. As such, the position of the workpiece contact assembly 540 with respect to the nosepiece assembly 400 is adjustable to adjust the depth to which a fastener is driven.

The engagement portion 566*a* is configured to contact the inner frame 48 when the workpiece contact assembly 540 moves beyond the retracted position (e.g., any subsequent movement of the workpiece contact assembly 540 in a retracting direction), such as when the driver 10 is dropped. Accordingly, the inner frame 48 defines a stop surface that the engagement portion 566*a* contacts when under a significant force. For example, if the driver 10 is dropped and it lands with the nosepiece assembly 400 facing downwardly, the force exerted on the workpiece contact assembly 540 contacting the ground would force the workpiece contact assembly 540 beyond the retracted position. The stop surface of the inner frame is therefore configured to limit movement of the engagement portion 566*a* of the workpiece contact assembly 540 (e.g., when dropped) thereby protecting the components of the workpiece contact assembly 540 and the depth of drive adjustment mechanism 600. In other words, because the engagement portion 566*a* of the workpiece contact assembly 540 contacts the inner housing 48, rather than the support member 604*a*, the structure of the workpiece contact assembly 540 and depth of drive adjustment mechanism 600 is strengthened to limit or prevent bending/breaking such as if the tool is dropped. In other embodiments, the nosepiece assembly 400 (e.g., the base portion 510), which is typically constructed of a harder, robust material (e.g., metal), may include a stop surface instead of the inner frame 48.

Although the invention has been described in detail with reference to certain preferred embodiments, variations and modifications exist within the scope and spirit of one or more independent aspects of the invention as described.

What is claimed is:

1. A powered fastener driver comprising:

a housing;

a cylinder positioned within the housing;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter operable to move the piston and driver blade, in unison, from the BDC position toward the TDC position;

a drive unit positioned within the housing and operably coupled to the lifter, the drive unit including a motor;

an inner frame positioned within the housing and configured to support the drive unit;

a workpiece contact assembly coupled to the housing and movable from an extended position to a retracted position in response to contact with a workpiece, the workpiece contact assembly including a biasing element that biases the workpiece contact assembly into the extended position;

a magazine configured to receive fasteners, the magazine including a first end and a second end opposite the first end; and a nosepiece assembly coupled to the first end of the magazine and including a channel from which consecutive fasteners from the magazine are driven;

wherein the magazine further includes a top side, a bottom side opposite the top side, and a support member extending from the top side, the support member coupled to the housing and including a polygonal shape with a first side extending from the top side at a location between the first end and the second end, and a second side extending from the top side at a location at or adjacent the second end, wherein a surface of the first side of the support member abuts a surface of the housing.

2. The powered fastener driver of claim 1, wherein the workpiece contact assembly is engageable with the inner frame in response to an applied force that moves the workpiece contact assembly beyond the retracted position.

3. The powered fastener driver of claim 2, wherein the workpiece contact assembly includes a first section defining a first end, the first section including an arm, an engagement portion coupled to the first end, and a screw portion opposite the engagement portion, and a second section coupled to the first section and defining a second end opposite the first end, the second end configured to contact the workpiece, wherein the screw portion couples the first section to the second section, and wherein the engagement portion is configured to contact the inner frame in response to the applied force that moves the workpiece contact assembly beyond the retracted position.

4. The powered fastener driver of claim 3, wherein a depth of drive adjustment mechanism includes a knob coupled to and rotatable with the arm, and wherein the knob is configured to adjust a protruding length of the second end of the second section of the workpiece contact assembly relative to a distal end of the nosepiece assembly.

5. The powered fastener driver of claim 3, wherein the biasing element is positioned between the inner frame and the engagement portion.

6. The powered fastener driver of claim 2, wherein the inner frame is constructed from metal.

7. The powered fastener driver of claim 2, wherein the biasing element is positioned between the inner frame and the workpiece contact assembly.

8. The powered fastener driver of claim 1, wherein the magazine is inclined relative to the channel with the second end being further from the housing than the first end in a direction parallel to the driving axis.

9. The powered fastener driver of claim 1, wherein the magazine further includes a top side and a bottom side opposite the top side, the top side being positioned adjacent the housing, and further comprising a guide positioned within the magazine and configured to receive a portion of each of the fasteners, the guide including a first end and a second end opposite the first end, the guide being inclined relative to the first end of the magazine, the second end of the guide being further from the top side than the first end of the guide in a direction parallel to the driving axis.

10. A powered fastener driver comprising:

a housing;

a cylinder positioned within the housing;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter operable to move the piston and driver blade, in unison, from the BDC position toward the TDC position;

a drive unit supported by the housing and operably coupled to the lifter, the drive unit including a motor;

a magazine configured to receive fasteners, the magazine including a first end and a second end opposite the first end; and a nosepiece assembly coupled to the first end of the magazine and including a channel from which consecutive fasteners from the magazine are driven;

wherein the magazine is inclined relative to the channel with the second end being further from the housing than the first end in a direction parallel to the driving axis.

11. The powered fastener driver of claim 10, wherein at least a portion of a surface of the first end of the magazine is positioned at a non-parallel angle relative to the driving axis.

12. The powered fastener driver of claim 11, wherein the angle measures less than approximately three degrees.

13. The powered fastener driver of claim 11, wherein the magazine defines a longitudinal axis along which the fasteners are transported within the magazine, and wherein the longitudinal axis is obliquely oriented relative to the driving axis.

14. The powered fastener driver of claim 11, wherein the magazine further includes a top side, a bottom side opposite the top side, and a support member extending from the top side, the support member coupled to the housing and including a polygonal shape with a first side extending from the top side at a location between the first end and the second end, and a second side extending from the top side at a location at or adjacent the second end, wherein a surface of the first side of the support member abuts a surface of the housing.

15. A powered fastener driver comprising:

a housing;

a cylinder positioned within the housing;

a piston movable within the cylinder from a top-dead-center (TDC) position to a driven or bottom-dead-center (BDC) position;

a driver blade attached to the piston for movement therewith along a driving axis from the TDC position toward the BDC position for driving a fastener into a workpiece;

a lifter operable to move the piston and driver blade, in unison, from the BDC position toward the TDC position;

a drive unit supported by the housing and operably coupled to the lifter, the drive unit including a motor;

a magazine configured to receive fasteners, the magazine including a first end, a second end opposite the first end, a top side adjacent to the housing, and a bottom side opposite the top side;

a guide positioned within the magazine and configured to receive a portion of each of the fasteners, the guide including a first end and a second end opposite the first end, the guide being inclined relative to the first end of the magazine with the second end of the guide being further from the top side than the first end of the guide in a direction parallel to the driving axis; and a nosepiece assembly coupled to the first end of the magazine and including a channel from which consecutive fasteners from the magazine are driven.

16. The powered fastener driver of claim 15, wherein the top side of the magazine defines a plane and at least a portion of the guide extends at a generally non-parallel angle relative to the plane.

17. The powered fastener driver of claim 16, wherein the angle measures approximately 0.5 degrees to 3 degrees.

18. The powered fastener driver of claim 15, wherein the guide is configured to receive a head of the fastener such that the fastener is oriented at a non-parallel angle relative to the driving axis.

19. The powered fastener driver of claim 18, wherein the magazine defines a longitudinal axis, and wherein the guide defines a longitudinal axis that is angled obliquely relative to the longitudinal axis of the magazine and the driving axis, such that the fasteners move along the longitudinal axis of the magazine obliquely relative to the driving axis.

20. The powered fastener driver of claim 15, wherein the magazine further includes a support member extending from the top side, the support member coupled to the housing and including a polygonal shape with a first side extending from the top side at a location between the first end and the second end, and a second side extending from the top side at a location at or adjacent the second end, wherein a surface of the first side of the support member abuts a surface of the housing.

* * * * *